Dec. 8, 1970 L. C. JOHNSON 3,545,088
GAGE SETTING DEVICE
Filed Aug. 20, 1968 2 Sheets-Sheet 1
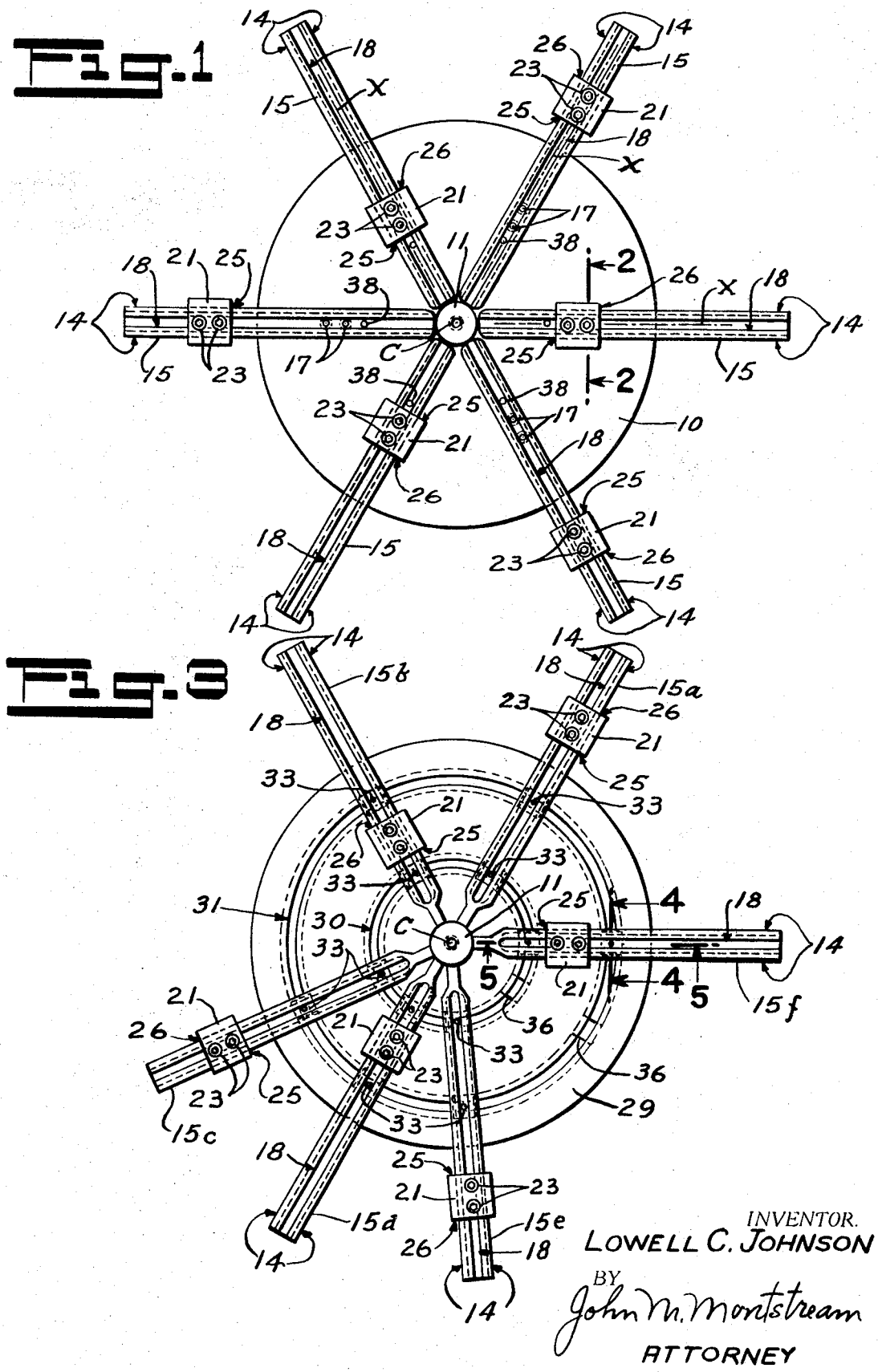
INVENTOR.
LOWELL C. JOHNSON
BY John M. Montstream
ATTORNEY

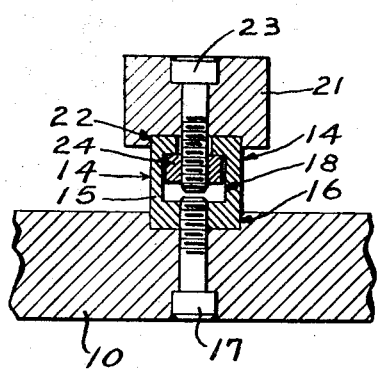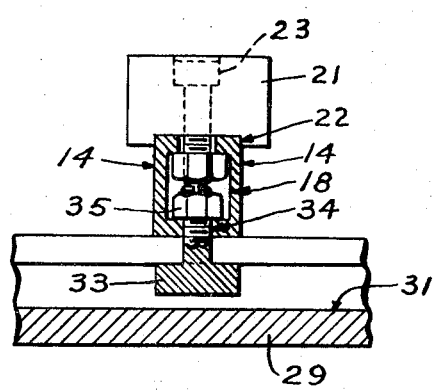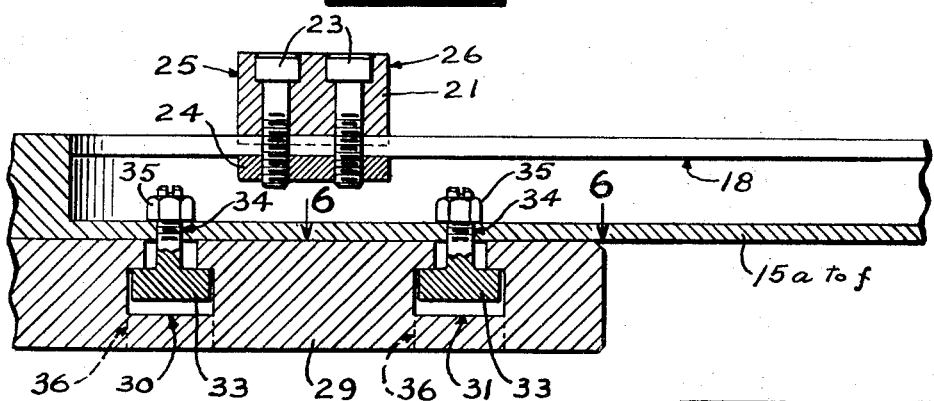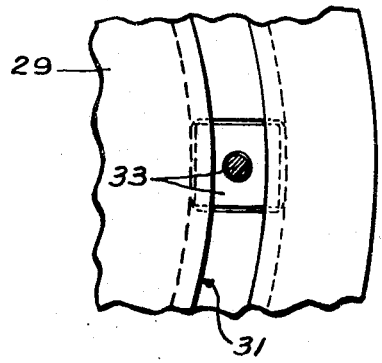

United States Patent Office 3,545,088
Patented Dec. 8, 1970

1

3,545,088
GAGE SETTING DEVICE
Lowell C. Johnson, West Granby, Conn., assignor to The Johnson Gage Company, Bloomfield, Conn., a corporation of Connecticut
Filed Aug. 20, 1968, Ser. No. 754,039
Int. Cl. G01b 3/30
U.S. Cl. 33—174                                      8 Claims

ABSTRACT OF THE DISCLOSURE

The gage setting device comprises a central post, preferably mounted on a base, and a plurality of guideways extending radially therefrom. Each guideway carries a gage setting member having one and preferably two radially spaced gage setting surfaces extending at right angles with respect to the guideway axis. A setting member which has two gage setting surfaces, the surfaces are spaced apart a precise radial dimension for setting both internal and external gages. The setting device may have anywhere from two to six guideways to be used for setting a gage or gages having two gaging elements engaging across a diameter or three gaging elements spaced apart 180 degrees. The preferred construction includes a setting device having at least three guideways with at least two guideways being adjustable angularly with respect to the third guideway which may be fixed or angularly adjustable.

---

The invention relates to a gage setting device for setting the indicator and/or the gaging elements of a dimensional gage which is used for testing the accuracy of the diameter of a test part. The device is particularly suited for setting thread gages of a wide range of sizes. The setting device may be constructed also for setting a gage which is used for testing the accuracy of a spline or more particularly, the setting device may be adjusted to set either three element gages having three equally spaced gaging elements and three element gages having gaging elements spaced for testing the accuracy of a spline. In order to use the setting device for setting thread gages having gaging elements with thread engaging ridges, the gaging elements must have a reference surface either tangent to the pitch circle of the thread or parallel to a tangent at a precise distance therefrom or from the outer diameter of an internal gage or the inner diameter of an external gage provided these dimensions have been made precise.

Dimensional gages for measuring diameters, and particularly a gage for testing the accuracy of the diameter of a screw thread, are set to size by a master ring for internal surfaces and a master plug for gages for external surfaces. A master plug or ring was required for each size. When the surface to be gaged is a screw thread such master setting screw threaded rings and plugs are expensive and one ring must be made for each size or diameter as well as a master ring or plugs for each different pitch of the screw thread of the same diameter. The setting device to be described takes the place of these master setting rings and plugs and can be used for setting gages for either plain cylindrical or threaded cylindrical surfaces.

It is an object of the invention to construct a gage setting device which can be set up and used for setting a gage of any diameter within the range of the device.

Another object is to construct a gage setting device which can be used for setting a gage of the type using three gaging elements or of the type using two gaging elements.

Another object of the invention is to construct a gage setting device which is capable of being used to set and retain the setting for two different gages of the three element type, in which the gaging elements are spaced apart 120 degrees from each other, without disturbing the setting for the other gage.

A still further object is to construct a gage setting device which can be used as set forth in the proceeding paragraphs and in addition thereto can be set and used to set a gage for testing the diameter of a spline.

Again, it is an object to construct a gage setting device for setting and holding the setting for two different gages each having three gaging elements spaced 120 degrees apart and which, when not so set, can be used to set and hold the setting for three different gages of the type having two gaging elements, such as gaging rolls or segments which are spaced 180 degrees apart for engagement of the test part across its diameter.

Other objects of the invention will be more apparent from the following description when taken in connection with the accompanying drawings illustrating preferred embodiments thereof in which:

FIG. 1 is a plan view of the gage setting device constructed for more than one gage;

FIG. 2 is a section taken on line 2—2 of FIG. 1;

FIG. 3 is a plan view showing a gage setting device having angularly adjustable guideways;

FIG. 4 is a section taken on line 4—4 of FIG. 3;

FIG. 5 is a section taken on line 5—5 of FIG. 3; and

FIG. 6 is an enlarged partial view taken on line 6—6 of FIG. 5.

The gage setting device is basically a center reference with a plurality of guideways extending radially therefrom, each being angularly spaced from each other, and a setting element carried by each guideway spaced from the center reference. The device shown preferably uses a base 10 having a reference post 11 at the center thereof which post is suitably secured thereto. The post shown is cylindrical although it may take other forms as will be described. This reference post is dimensioned precisely, that is to a particular diameter if round, such as one inch, or across flats if other than round, such as hexagonal or a rotatable post with a flat on the central axis of the gaging setting device in the manner of Pat. 2,849,804. Such an axial reference surface provides a reference surface of precise dimension.

A plurality of guideways 14 extend radially from the reference post and in the construction particularly illustrated. The base carries six such guideways extending radially from the reference post which guideways are spaced 60 degrees apart. Originally the guideways were T slots provided directly in the base which made a very heavy device, and awkward for this reason, consequently, the base is now made of aluminum of relatively smaller diameter with respect to the guideways and carries a plurality of radially extending guideway members 15 secured thereto, six being shown. The guideway members preferably extend beyond the periphery of the base. When the guideway members are in fixed angular position, as shown, the base has six radially extending grooves 16 and each groove receives a guideway member. The guideway members carry a guideway preferably in the form of a T slot and each member is suitably secured in its groove in the base by bolts 17. The guideway members have provision for adjustably securing a setting member thereon which is shown particularly as a T slot 18.

A setting member 21, FIG. 2 is provided for each guideway and is adjustable radially in or on the guideway 14. With the guideway being the side surfaces of the guideway member, the setting member has a groove 22 snugly but slidably engaging the side 14. When the guideway member is provided with a T slot, the setting member may be secured in adjusted position upon the guideway member such as by a pair of screws 23 and a clamp plate 24 which engages an inner surface of the T slot. Each setting members has at least one setting surface which extends at right angles to the guideway axis X. If the radially inward surface 25 of the setting member is the setting surface, the device will be used to set internal gages. If the radially outward surface 26 of the setting member is the setting surface, the device will be used to set external gages. Preferably the setting members have both raidally located inward and outward setting surfaces 25 and 26 which are spaced a precise radial dimension, such as one inch, so that the setting device may be used to set both internal and external gages, as will be described more fully hereinafter.

In using the gage setting device for setting the rolls of a tri-roll thread gage, each roll is provided with a flat which is tangent to the pitch circle of the thread ridges on the gaging roll either through the thread ridges or adjacent thereto, as shown in Pat. 2,849,804. Each segmental gaging element has a similar reference flat which is tangent to the pitch circle of the thread ridges of the gaging element.

The center reference post may be hexagonal for a setting device as in FIG. 1 having six fixed guideways spaced 60 degrees apart. The dimensions across the flats is a precise measurement such as one inch. Whether the reference post is circular or hexagonal or other suitable form Johanson, or J, blocks are placed between the reference post and the radially inward surface of each of the setting members. The blocks selected provide the proper dimension to the setting surface bearing in mind that for a reference post of 1 inch diameter, one-half inch of the dimension is represented by the radius, or radial dimension if hexagonal, of the reference post. In other words, if the gage is to be used to test a six inch internal thread, the J blocks used to set the setting members will have a dimension of one-half of the pitch diameter of this thread minus one-half inch. Each setting member is set to this same dimension and clamped in place. The gage to be set is then placed centrally on the gage setting device and the pitch flats on the gaging rolls, or segments, is turned to engage the inner setting surface 25 of its respective setting member and the gage elements are expanded radially outwardly by spring means in the gage, into contact with the inner setting surface. The indicator dial is then adjusted to read zero. The gage has then been set to measure or test the accuracy of the internal thread on test pieces. The gaging elements of the gage usually are adjustable such as by being mounted on eccentric studs, to provide some initial adjustment for the gaging elements if such adjustment is necessary.

If the gage is to be used to test for the accuracy of an external thread then the proper J blocks are assembled together to give a dimension equal to the pitch radius of the thread for which the gage is to be set minus one-half inch for the radius of the reference post and minus one inch for the dimension between setting surfaces 25 and 26 of the setting member 21. Each of the three setting members are then adjusted to contact the ends of the assembled J blocks whereupon the setting members are clamped in place. The gage is set with its gaging rolls or segments approximately at the proper location whereupon the gage is placed over the surfaces 26 of the setting members with the reference flats on the gaging rolls, or the reference surfaces on the gaging segments, and contracted radially inwardly so that each reference flat of the gaging elements contacts its radial outer surface 26 of each of the three setting members. With the spring means of the gage pressing the gage elements radially inwardly and engaging the outer setting surfaces 26 of the setting members, the dial of the indicator carried by the gage is set to zero and the gage is then ready to test the accuracy of an external product or test thread.

The gage setting device with six radially extending guideways fixed at 60 degrees apart can be used to set two three element gages at two different dimensions or sizes without disturbing the other setting. In addition with six guideways so located, the gage setting device can be used to set and hold the setting for three different gages of the type having two gaging elements spaced 180 degrees apart. The three pairs of radially opposite setting members 21 on their guideways would be set to their respective setting.

The gage setting device shows that the basic device for two element gages is two radially extending guideways or its equivalent a single diametrical guideway. The basic setting device for a three element gage is three fixed radial guideways. A setting device having wider application is one having four fixed guideways extending radially from the center post by providing three guideways spaced 120 degrees apart and between any two of such guideways locating a fourth radially extending guideway in alignment with the third or opposite guideway thereby providing two guideways in radial alignment for a two element gage and three guideways for a three element gage. A gage setting device for wider application is that illustrated with six guideways.

The gage setting device has even wider application when constructed with at least two guideways which are adjustable angularly with their axes remaining on the vertical center axis of the reference post. A gage setting device so constructed may also be used to set a gage constructed to test the diameter of splines. Usually splines are provided with an odd number of spline grooves for example seven, nine and so forth, equally spaced angularly with respect to the center of the spline. The seven grooved spline has its grooves spaced apart 51 degrees, 25 min., 43 seconds. A diameter through any one spline groove, therefore, bisects the angles between two opposite grooves and the gage with three gaging elements are spaced apart angularly in like manner to engage the two opposite spline elements. With at least two guideways adjustable angularly, with respect to a third guideway, the gage setting device may be adjusted to accommodate the setting of a three element spline gage in which the angle between the gaging elements corresponds with the spline spacing namely two and equal angles and one considerably smaller. This gage setting device can also be used to set a gage having three gaging elements spaced apart equally by 120 degrees.

A gage setting device of this capability is illustrated in FIG. 3 in which at least two guideway members are adjustable angularly while retaining its axis or center line in alignment with the center axis C of the reference post. A base 29 is provided with means to angularly adjust the position of at least two of the guideways angularly on the base. This angular adjusting means may take several forms that shown including at least one but showing a pair of radially spaced arcuate T slots 30 and 31. The arcuate T slots are preferably circular so that all guideway members may be adjusted angularly. In a simpler form the arcuate T slots may be of such extent to angularly adjust guideway members 15C and 15E from an angle of 180 degrees therebetween to spline angles. Each adjustable guideway member is secured within adjusted position by suitable securing means, that shown being a clamping member 33 having a threaded shank passing through a hole 34 in the guideway member and a nut 35 on the clamping member shank. The clamping member may be inserted into the T slot such as through a base hole 36. The angular adjustment may be aided by an angular or protractor scale carried on the base (not shown). When the gaging setting device is constructed with angularly adjustable guideway members, the reference post is preferably of cylindrical form which accommodates for any angular position. In order to assist in aligning each guideway member so that its axis or center line passes through the center axis C of the reference post, it is preferably constructed to center on the reference post at the inner end thereof such as with an arc to engage the post, or a V groove the sides of which engage the surface of the reference post.

The gage setting device could be provided with two gage setting members for a plurality of or for each guideway to accommodate a second gage setting member provided the gages to be set are of sufficient difference in size setting and/or a difference in type such as external and internal so that one set of setting members will not interfere with the setting of the other gage.

The setting device can also be set by using an external or internal micrometer. As an example for setting an internal gage, the pitch diameter or radius, is learned from any text giving this information. Using an external micrometer from the center post to the outer setting surface 26, the micrometer reading should be the pitch radius plus ½ inch for the center reference post and plus 1 inch for the radial dimension of the setting member. This micrometer reading will place the inner setting surface 25 at the proper distance. For setting the gage setting members for an external gage, the micrometer reading would be the pitch radius plus ½ (half) inch for the center post which will place the outer setting surface 26 in the correct setting position.

The guideway members may be extended, if this should be desired, for even larger gages by providing one or more additional holes 38 in the guideway member to receive one of the bolts 23.

The gage setting device can, if desired, be mounted on a pedestal so that the base is in a vertical plane. The gage is then set to the gaging device in the position which it assumes when gaging which is usually with the axis of the gage extending horizontally.

This invention is presented to fill a need for improvements in a gage setting device. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage setting device for a gage having a plurality of gaging elements each with a setting surface comprising a center post having a vertical axis and being solely a post, a plurality of guideways of substantial length extending radially from the central post, each guideway having a radial guideway axis in alignment with the axis of the central post, the dimension of the post from the vertical axis being precise and equal at the radial axis of each guideway, and a gage setting member adjustably mounted on each guideway having at least one gage setting surface extending at right angles to the guideway axis and being on the same side of the guideway as the post.

2. A gage setting device as in claim 1 including a base, each guideway comprising a guideway member having guiding surfaces, and means securing each guideway member to the base.

3. A gage setting device a sin claim 1 in which a plurality of the gage setting members have a second gage setting surface extending at right angles to the guideway axis, each gage setting member having a precise dimension between its two gage setting surfaces and each setting member having the same precise dimension between its gage setting surfaces.

4. A gage setting device as in claim 1 in which there are four guideways extending from the center post with two being in radial alignment and two being disposed on either side of one of the guideways in radial alignment at angles substantially less than 90 degrees.

5. A gage setting device as in claim 1 in which there are six guideways angularly disposed at 60 degrees from each other.

6. A gage setting device as in claim 1 including a base, at least three guideways each comprising a guideway member carried by the base and extending from the center post, each guideway member having guideway surfaces for the setting member, and mounting means mounting at least two of the guideway members for adjustment angularly with respect to each other and a third guideway member.

7. A gage setting device as in claim 6 in which the mounting means includes at least one arcuate T slot having the center of its arc at the vertical axis of the center post, and clamping means for each angularly adjustable guideway member received in the T slot to secure the guideway member in adjusted angular position.

8. A gage setting device as in claim 6 in which the guideway includes six guideway members, the T slot being a circle, and mounting means for each guideway member to angularly adjust the position of the member.

References Cited

UNITED STATES PATENTS

| | | | |
|---|---|---|---|
| 1,373,367 | 3/1921 | Summers | 33—191 |
| 2,479,912 | 8/1949 | Desy | 33—191 |
| 2,543,026 | 2/1951 | Jennings | 33—191 |

SAMUEL S. MATTHEWS, Primary Examiner